United States Patent [19]

McGee

[11] 4,006,874
[45] Feb. 8, 1977

[54] TUBE CLAMP

[75] Inventor: James Monroe McGee, Seattle, Wash.

[73] Assignee: The Boeing Company, Seattle, Wash.

[22] Filed: Sept. 29, 1975

[21] Appl. No.: 617,925

[52] U.S. Cl. .............................. 248/74 R; 248/55; 308/4 R
[51] Int. Cl.² ............................................ F16L 3/08
[58] Field of Search ......... 16/2; 174/153 R, 153 G; 248/54–56, 60, 68, 70, 74, 298; 308/4 R, 237 H, 239

[56] References Cited

UNITED STATES PATENTS

| | | | |
|---|---|---|---|
| 1,671,338 | 5/1928 | Banks et al. | 248/74 R |
| 1,885,504 | 11/1932 | Austin | 174/42 |
| 2,170,545 | 8/1939 | Burton | 308/237 |
| 2,227,528 | 1/1941 | Adler | 174/135 |
| 2,255,400 | 9/1941 | Triplett et al. | 248/74 B |
| 2,288,158 | 6/1942 | Ellenwood | 174/135 |
| 2,291,887 | 8/1942 | Ellenwood | 174/40 |
| 2,470,814 | 5/1949 | Hain | 248/74 R X |
| 2,481,931 | 9/1949 | Kester | 308/237 |
| 2,543,154 | 2/1951 | Cox | 308/237 |
| 2,937,835 | 5/1960 | Csmereka | 248/74 R |
| 3,161,906 | 12/1964 | Yarm | 174/153 G X |
| 3,243,759 | 3/1966 | Miller | 174/153 G X |
| 3,486,531 | 12/1969 | Nalodka | 138/103 |
| 3,716,650 | 2/1973 | De Mecquenem | 174/47 |
| 3,778,527 | 12/1973 | Nigol | 174/42 |
| 3,844,588 | 10/1974 | Jocsak | 248/56 X |

FOREIGN PATENTS OR APPLICATIONS

| | | | |
|---|---|---|---|
| 882,653 | 11/1961 | United Kingdom | 248/74 R |

*Primary Examiner*—Lawrence J. Staab
*Attorney, Agent, or Firm*—Conrad O. Gardner

[57] ABSTRACT

A tube clamp device including a sleeve like assembly comprising two identically semi-cylindrically shaped half sleeve members. Each of the half sleeve members is sized to the tube diameter being clamped, and has tongues thereon which extend beyond half the circumference of the tube being clamped to provide independent clamping or gripping of the tube by snap on action, the tongues of both half sleeves further providing interlock to prevent separation of half sleeves and separate longitudinal movement of the half sleeves along the axis of the tube. Circumferential shoulders at each end of the half sleeves provide a saddle seating for a loop clamp surrounding the half sleeves between the circumferential shoulders thereof.

2 Claims, 4 Drawing Figures

TUBE CLAMP

This invention relates to mounting clamps for tubing and more particularly to tube clamps for hydraulic tubing utilized in environments which cause wear between tube and clamp.

In certain demanding environments, e.g. in high performance aircraft under conditions of high vibration levels, increased temperature, and aerodynamic buffeting and structural flexure, excessive wear tends to occur between the tube and clamp especially in the presence of abrasive contaminants which can cause hardening of resilient materials or cushions used in such clamps so that uniform bearing is difficult to maintain without increased maintenance and replacement of these mounting clamps.

As a consequence of the preceding, it is an object of this invention to provide tube clamping means comprising a sleeve like assembly for reducing inner tubing wear by transferring relative motion and hence wear from the tube to clamp interface to the interface between the outside of the sleeve like assembly and a surrounding loop clamp.

It is further object of this invention to provide a pair of interlocking semi-cylindrically shaped half sleeve members, each clamp clamping about a section of tubing to be supported, and wherein a loop clamp surrounding the pair of semi-cylindrically shaped half sleeve members provides a longitudinal sliding restraint between clamp and half sleeve members along the tubing axis which is less than the longitudinal sliding restraint between half sleeve members and inner tubing.

It is yet another object of this invention to provide a pair of semi-cylindrically shaped half sleeve members for snap on about a tubular member, and pressure means encircling the half sleeve members in a looser manner than the half sleeve members encircle the tubular member so that motion of parts and consequent wear during vibration occurs primarily between the pressure means encircling the half sleeve members and the half sleeve members rather than half sleeve members and tubular member.

Various efforts have been made in the past to advance the state of the art including the use of half sleeves as shown in U.S. Pat. No. 3,716,650. Further efforts which may be contrasted with the present invention include U.S. Pat. Nos. 1,885,504; 2,170,545; 3,486,531; and 3,778,527 which relate to sleeves clamped onto elongate members. Also, general wear sleeves are shown in U.S. Pat. Nos. 2,481,931 and 2,543,154. Note may also be made of U.S. Pat. Nos. 2,227,528; 2,288,158; and 2,291,887 which show conduit supports utilized in an aircraft environment where the supports generally comprise an outer support clamp, a resilient support and a conduit contracting metal strip.

In order that the present invention may be readily understood, the following embodiment will be described by way of example with reference to the accompanying drawing, on which:

Figure 1:
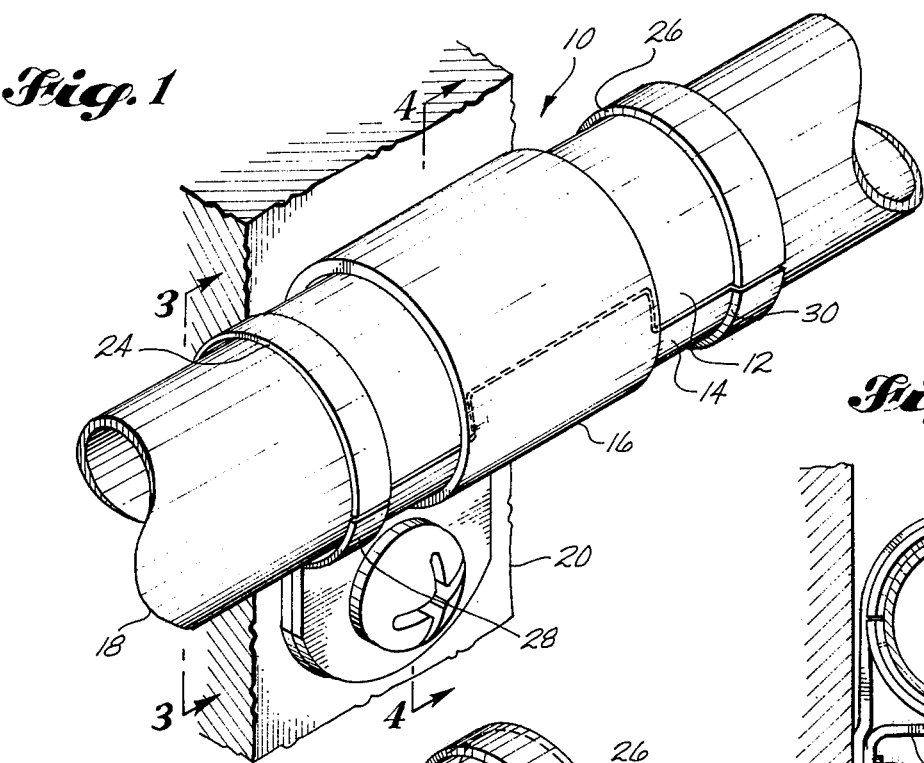
FIG. 1 is a view, after assembly, of the tube clamp attaching a tube to supporting structure therefor.

Turning now to FIG. 1, it will be noted that the tube clamp indicated generally at 10 comprises three parts, viz. a pair of generally cylindrically shaped half sleeve members 12 and 14, and a surrounding loop clamp 16 for supporting the half sleeve members 12 and 14 about inner tubing member 18, loop clamp 16 providing the holding support to main structure 20 for tube member 18. Also visible in FIG. 1 are radially outwardly extending end shoulders 24 and 26 of cylindrically shaped half sleeve member 12 and radially outwardly extending end shoulders 28 and 30 of cylindrically shaped half sleeve member 14 (the lower half of sleeve member as shown in FIG. 1) which provide a saddle seating region therebetween for seating of loop clamp 16.

Figure 2:
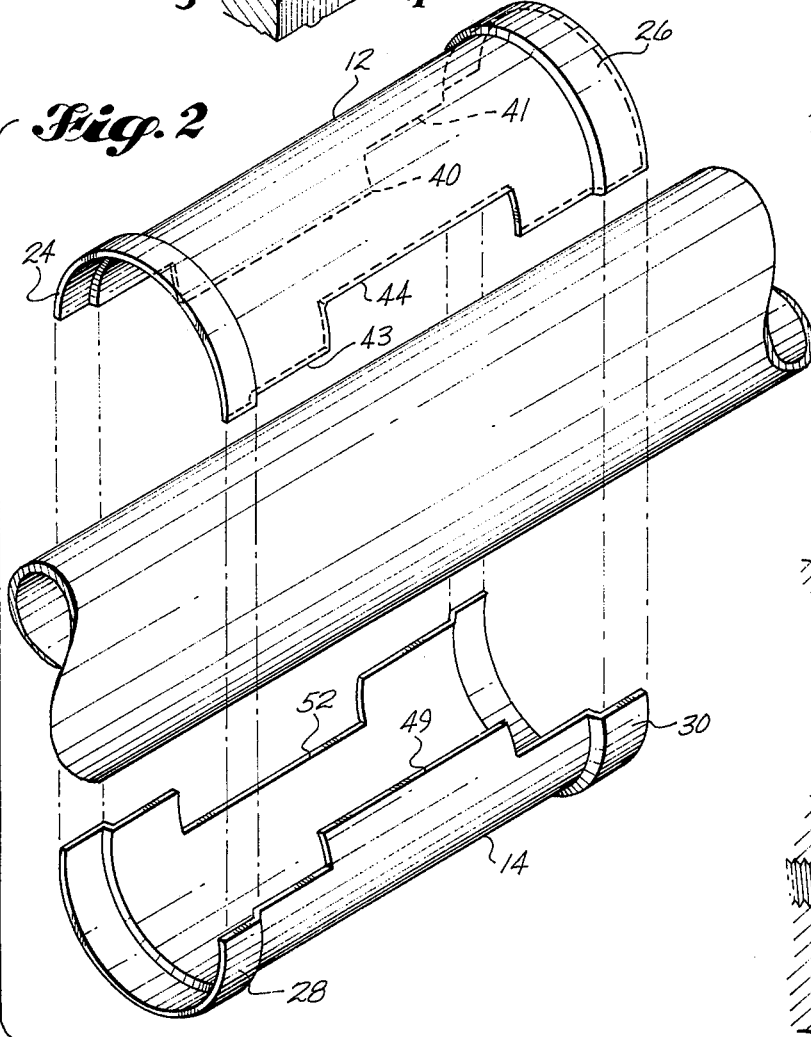
FIG. 2 is a view in perspective prior to assembly of tube clamp half sleeves showing their manner of organization about a conduit to be supported.

Turning now to FIG. 2, the two interchangeable and identically shaped cylindrically shaped half sleeve members 12 and 14 have an inside diameter substantially equal to or slightly less than the outside diameter of tube 18. Cylindrically shaped half sleeve member 12 has a tongue 40 located at the center of, and extending outward circumferentially from, a first longitudinal side 41 of half sleeve member 12, the second longitudinal side 43 of half sleeve member 12 having a slot 44 at the center thereof. Facing cylindrically shaped half sleeve member 14, identically dimensioned and structured, also has a tongue 49 and slot 52 which when positioned for assembly about tubular member 18 as shown in FIG. 2, permits interlocking of respective tongues and slots as shown in final assembly in FIG. 1. Each of half sleeve members 12 and 14 is snapped into position on tubular member 18 in the above mentioned interlocking relationship. Sleeve members 12 and 14 are made of a resilient material (e.g. Iconel 750). Also, sleeve members 12 and 14 have an inside diameter equal to or less than the outside diameter of inner tubing member 18, and sleeve members 12 and 14 are structured to encircle (by means of the tongue 40 extension circumferentially to grip the back side of inner tubing member 18) more than half the circumference of inner tubing member 18 so that sleeve members 12 and 14 may each be snapped into position on inner tubing member 18 by springing the half sleeve to a larger diameter. Since outer loop clamp 16 (as seen in FIG. 1) is looser on sleeve members 12 and 14 than sleeve members 12 and 14 on inner tubing 18, loop clamp 16 is thereby permitted to move more easily along the longitudinal axis 88 of sleeve members 12 and 14 while sleeve members 12 and 14 motion is more restricted along the longitudinal axis 88 of tube member 18, resulting in wear due to vibration and/or motion occuring on loop clamp 16 and sleeve members 12 and 14, and not on tubular member 18, thereby importantly extending the life of tubular member 18. Although sleeve members 12 and 14 firmly grip tubular member 18 and do not normally move, in an extreme and unexpected case of vibration and/or motion, sleeve members 12 and 14 would move along tubular member 18 in an amount depending upon the extent of tightening force applied to and by loop clamp 16. Such motion could cause the entire tube clamp assembly 10 to move on tubular member 18 if the assembly was not properly installed with loop clamp 16 not centered in the saddle region midway between end shoulders 24 and 26 but improperly against one of end shoulders 24 and 26. When properly positioned in the saddle region, loop clamp 16 will tend to automatically maintain its position midway between shoulders 24 and 26.

Figure 3:
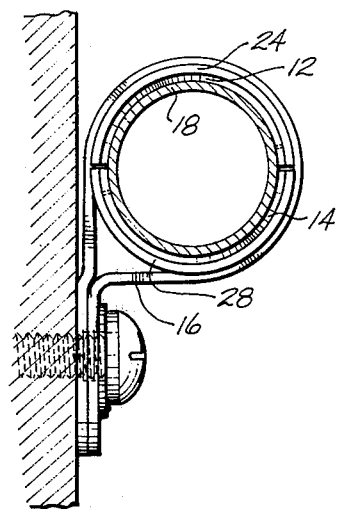
FIG. 3 is an end view in section seen along the line 3—3 of FIG. 1 showing the cylindrically shaped half sleeve members and their saddle forming end shoulders; and, FIG. 4 is a mid section view of the clamp along line 4—4 of FIG. 1 showing the interlocking relationship of mating center tabs of each of the cylindrically shaped half sleeve members.

An end view of the assembly 10 of FIG. 1 taken along line 3—3 is shown in FIG. 3 facilitating a showing of end shoulders 24 and 28 which are of larger outer diameter than the outer diameter at the longitudinal diameter of cylindrically shaped half sleeve members 12 and 14.

Figure 4:
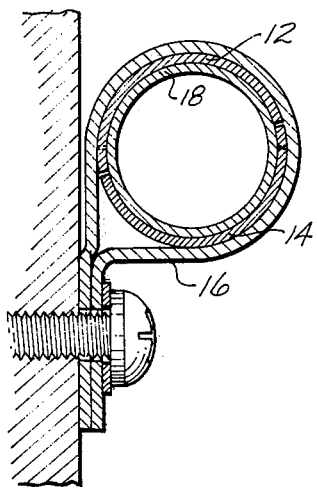

The sectional view of FIG. 4 taken along line 4—4 of FIG. 1 is believed helpful in showing the aforementioned interlocking tongue-slot relationship of cylindrically shaped half sleeve members 12 and 14 when snapped onto tubular member 18. It should be noted that failure in tightness of loop clamp 16 will not result in loss of the grip between tubular member 18 and half sleeve members 12 and 14 since cylindrically shaped half sleeve members 12 and 14 are retained on tubular member 18 by snap on action.

I claim:

1. Clamping apparatus for supporting a metal tube from fixed structure, the apparatus comprising a split sleeve surrounding the tube, said sleeve having identical, interlocking halves, interlocking tongues and slots and raised shoulders at their ends, and a loop clamp surrounding the split sleeve between the end shoulders and attached to the fixed structure, the improvement comprising having the interlocking tongues extending cylindrically from the interlocking halves and cylindrically surrounding more than 180° of the tube circumference so that the sleeve halves must be snapped into place to be installed onto the tube and so that axial displacement of said sleeve along said tube is frictionally resisted by the spring clamp action of each part of said split sleeve said improvement further comprising the width of said strap of said loop clamp being less than the distance between said end shoulders of said split sleeve, so that said sleeve can be displaced axially in said surrounding clamp, and the inside diameter of said loop clamp being such that it must be snapped into place to fit around the outside diameter of said sleeve so that said axial displacement between said sleeve and said loop clamp is frictionally resisted, the frictional resistance between said loop clamp and said sleeve being less than the frictional resistance between said sleeve and the metal tube.

2. A method of supporting a tube from fixed structure comprising the steps of: protecting the clamped portion of tube with a split sleeve, the halves of which are interlocked and are a spring fit on the tube so that axial displacement of the sleeve along the tube is frictionally resisted, said split sleeve having shoulders at its ends; mounting said sleeve in a loop clamp the width of which is less than the distance between said end shoulders of said sleeve and the installed inside diameter of which is less than the outside diameter of the sleeve between the end shoulders so that axial displacement of said sleeve in said clamp is frictionally resisted; sizing said sleeve and said clamp so that said frictional resistance to displacement of said sleeve on the tube is greater than said frictional resistance to displacement of said sleeve in said clamp, and attaching said clamp to the fixed structure.

* * * * *